United States Patent
Liu et al.

(10) Patent No.: US 8,243,716 B2
(45) Date of Patent: Aug. 14, 2012

(54) SYSTEM AND METHOD FOR PREVENTING SPAM OVER INTERNET TELEPHONY

(75) Inventors: Lifeng Liu, Shenzhen (CN); Zhibin Zheng, Shenzhen (CN); Kai Zhao, Shenzhen (CN); Guanzhou Lin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1348 days.

(21) Appl. No.: 11/858,022

(22) Filed: Sep. 19, 2007

(65) Prior Publication Data

US 2008/0075258 A1   Mar. 27, 2008

(30) Foreign Application Priority Data

Sep. 25, 2006 (CN) .......................... 2006 1 0152402

(51) Int. Cl.
*H04L 12/66* (2006.01)
*H04M 3/22* (2006.01)
*H04M 3/42* (2006.01)

(52) U.S. Cl. ................. 370/352; 379/32.05; 379/210.02

(58) Field of Classification Search .................. 370/352; 379/32.05, 210.02
See application file for complete search history.

(56) References Cited

U.S. PATENT DOCUMENTS

| | | | |
|---|---|---|---|
| 6,330,317 B1 | 12/2001 | Garfinkel | |
| 7,042,997 B2 | 5/2006 | Jones | |
| 7,231,030 B2 | 6/2007 | Jones | |
| 2003/0152207 A1 | 8/2003 | Ryan | |
| 2004/0260155 A1 | 12/2004 | Ciarniello et al. | |
| 2006/0135132 A1 | 6/2006 | Cai et al. | |
| 2006/0182029 A1* | 8/2006 | Kealy et al. | 370/230 |
| 2007/0039040 A1* | 2/2007 | McRae et al. | 726/4 |
| 2007/0041372 A1* | 2/2007 | Rao et al. | 370/356 |

FOREIGN PATENT DOCUMENTS

| | | |
|---|---|---|
| CN | 1487684 A | 4/2004 |
| CN | 1719812 A | 6/2006 |
| CN | 1794759 A | 6/2006 |
| CN | 1794761 A | 6/2006 |

OTHER PUBLICATIONS

Niccolini et al., "SIP Extensions for SPIT Identification," IETF, 1 (Feb. 2006) draft-niccolini-sippinq-feedback-spit-01.txt.
Rohwer et al., "TNG White Paper: Abwehr von Spam over Internet Telephony (SPIT-AL)" (Jan. 31, 2006) www.spit-abwehr.de/Whitepaper_SPITAL_20060310.pdf.
Rosenberg et al., "The Session Initiation Protocol (SIP) and Spam," IETF, vol. sipping (2) (Mar. 6, 2006) draft-ietf-sippinq-spam-02.txt.

(Continued)

*Primary Examiner* — Asad M Nawaz
*Assistant Examiner* — Nicholas Jensen
(74) *Attorney, Agent, or Firm* — Leydig, Voit & Mayer, Ltd.

(57) ABSTRACT

A method for preventing Spam over Internet Telephony (SPIT), includes: a terminal receives a call request of a calling user; the terminal sets an identifier of the calling user into a SPIT reporting request upon receipt of the call request; and sends the SPIT reporting request to a server in response to an instruction of a called user that the call request is the SPIT.

2 Claims, 4 Drawing Sheets

OTHER PUBLICATIONS

European Patent Office, Examination Report in European Patent Application No. 07117152,4 (Jun. 7, 2010).

State Intellectual Property Office of the People's Republic of China, Examination Report in Chinese Patent Application No. 200610152402.9 (Dec. 5, 2008).

State Intellectual Property Office of the People's Republic of China, Examination Report in Chinese Patent Application No. 200610152402,9 (Jan. 15, 2010).

State Intellectual Property Office of the People's Republic of China, English Translation of Written Opinion of the International Searching Authority in International Patent Application No. PCT/CN2007/070726 (Jan. 3, 2008).

Rosenberg et al., "The Session Initiation Protocol (SIP) and Spam draft-ietf-sipping-spam-02," SIPPING Internet-Draft (Mar. 6, 2006).

Rosenberg et al., "SIP: Session Initiation Protocol," Network Working Request for Comments: 3261, Obsoletes: 2543, rfc3261.txt (Jun. 2002).

Johnston et al., "Session Initiation Protocol (SIP) Basic Call Flow Examples," Network Working Group, Request for Comments: 3665, BCP: 75, RFC3665.txt (Dec. 2003).

State Intellectual Property Office of the People's Republic of China, Examination Report in Chinese Patent Application No. 200780000362.9 (Aug. 3, 2010).

$3^{rd}$ Office Action in corresponding European Application No. 07117152.4 (Aug. 16, 2011).

* cited by examiner

SYSTEM AND METHOD FOR PREVENTING SPAM OVER INTERNET TELEPHONY

CROSS REFERENCE

The present application claims the priority of Chinese Application No. 200610152402.9, which was filed on Sep. 6, 2006, granted on Jul. 20, 2011, which is hereby incorporated by reference.

FIELD OF THE INVENTION

The present invention relates generally to Voice over IP (VoIP) technology, and, more particularly, to a system and method for preventing Spam over Internet Telephony (SPIT).

BACKGROUND OF THE INVENTION

Next generation network (NGN) and VoIP services are developing rapidly around the world, and are greatly challenging conventional telephone service. However, cybersecurity is a crucial issue in the development of Internet systems, and the NGN based on IP technology inherit the vulnerability of IP networks. The VoIP and NGN services struggle with several Internet security problems.

Beyond conventional security threats, the VoIP service faces a new security threat, SPIT. The SPIT is not a traditional security threat in the original sense of security. Because SPIT exists in the course of normal transmission, it is not threatening to the network. The harm of SPIT comes from the disturb to each called party caused by the content transfer in the SPIT. VoIP service is inexpensive both on call costs and hardware costs, therefore, it is used by many. The spread of SPIT would bring in problems similar to SPAM: SPIT consumes large amounts of network resource, reducing the quality of service provides to users by providers. In another hand, the call from SPIT is unsolicited junk message according to the definition of SPIT. Therefore, the SPIT may severely interfere with users' life and job.

There is no technology addressing preventing SPIT in NGN in the prior art at present.

BRIEF SUMMARY OF THE INVENTION

Some embodiments of the present invention provide system and method for preventing Spam over Internet Telephony. According to an embodiment of the present invention, the method for preventing Spam over Internet Telephony, comprising: receiving by a terminal a call request by a calling user; setting by the terminal an identifier of said calling user into a SPIT reporting request upon receipt of said call request; and sending the SPIT reporting request to a server in response to an instruction by a called user that the call request is SPIT.

Numerous additional features, embodiments and benefits of the present invention will be apparent in view of the detailed description which follows.

DETAILED DESCRIPTION OF THE INVENTION

In an embodiment of the present invention, the terminal includes a SPIT reporting module, and the server includes a SPIT processing module. The terminal detects a received call request, and sends a SPIT reporting request to the server. The SPIT reporting request contains an identifier of the calling user which the terminal wants to report. The server obtains and saves the identifier, and sets the calling user as a SPIT user.

Upon a new call request, the server obtains an identifier from the received new call request containing the calling user's identifier, and determines whether the calling user's identifier is saved and set as a SPIT user. If the identifier is set as a SPIT user, it refuses the new call request.

Figure 1:
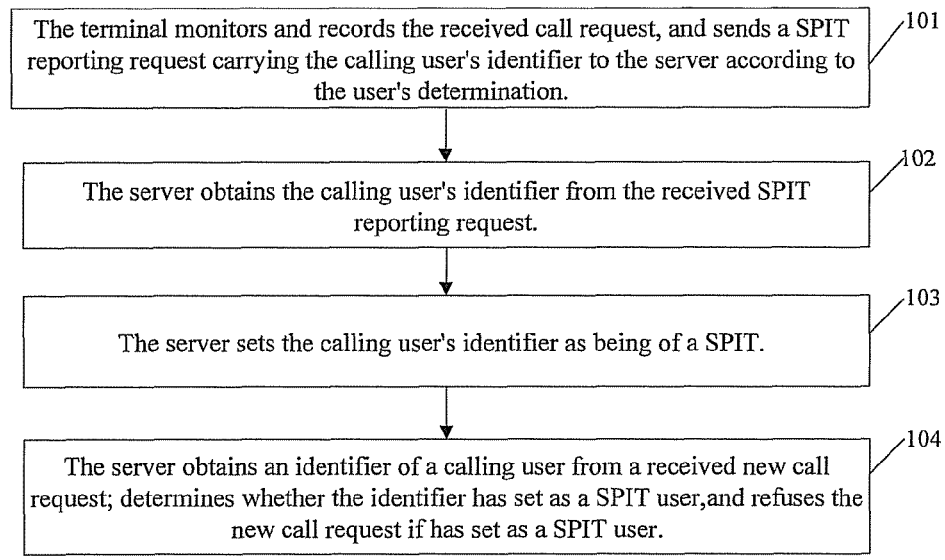
FIG. 1 is a flowchart showing a method for preventing SPIT according to an embodiment of the present invention.

As shown in FIG. 1, the method for preventing SPIT according to an embodiment of the present invention includes the following:

Block 101: The terminal detects and records received call requests, and sets the identifier of the calling user of the call request into a SPIT reporting request if the user decides the call request is by a SPIT caller, and sends the SPIT reporting request to a server.

Block 102: The server obtains and saves the calling user's identifier from the received SPIT reporting request. The SPIT reporting request may further include the call time and the called user's identifier of the call request. In such condition, the server obtains the call time, the calling user's identifier, and the called user's identifier from the SPIT reporting request in response to receiving the SPIT reporting request. The server compares the call time, the calling user's identifier and the called user's identifier with records of a call log maintained in the server. If the calling user didn't call the called user at the call time according to the records, the server will not process the SPIT reporting request, and will send a response message stating such to the terminal. If the calling user called the called user at the call time according to the records, the server processes as described in block 103.

Block 103: The server sets the calling user's identifier as being of a SPIT user. In an embodiment, if the SPIT reporting request contains the calling user's identifier and the called user's identifier. The server will obtain and save the calling user's identifier and the called user's identifier. The server will set the calling user as the reported user, and set the called user as the reporting user.

Before the server sets the calling user's identifier as being of a SPIT user, the server analyzes the number of times the calling user has been reported as a SPIT user in the past. If the number surpasses a preset threshold value, the calling user's identifier is set as being of a SPIT user.

Block 104: Upon receiving a new call request, the server obtains the calling user's identifier of the new call request, determines whether the calling user's identifier is saved and set as a SPIT user, and refuses to forward the new call request if the calling user's identifier is saved and set as a SPIT user.

If the calling user's identifier is not saved and set as a SPIT user, the server determines whether the calling user's identifier is in the list of reported users, and forwards the new call request if not in the list of reported users. Otherwise, the server determines whether the called user's identifier is in the list of the reporting users corresponding to the reported user, and it refuses the new call request if 'yes', the server forwards the new call request if 'no'.

In an embodiment, the server may send the identifiers of the SPIT users to other servers in communicating with the server. The other servers receive the identifiers and set respective users as SPIT users in their lists.

Figure 2:
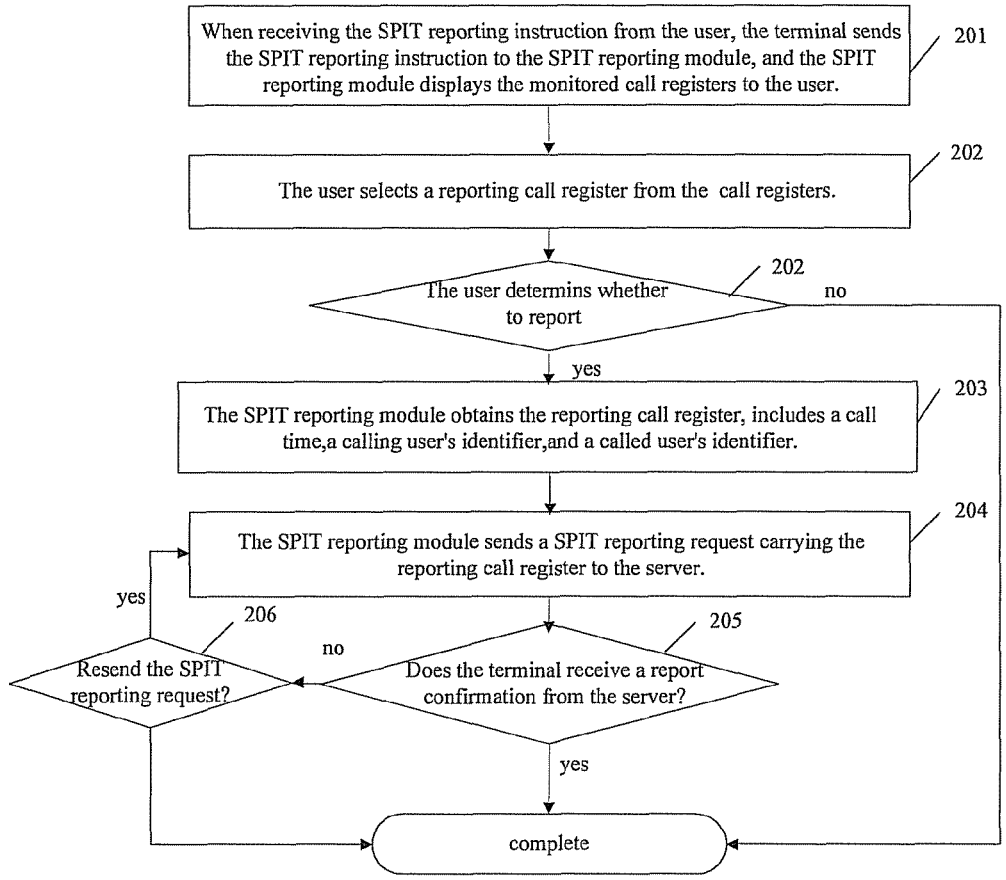
FIG. 2 is a flowchart showing the process of a terminal reporting SPIT, according to an embodiment of the present invention.

FIG. 2 is a flowchart showing the process of a terminal reporting SPIT, according to an embodiment of the present invention. In an embodiment, the communication between terminals is via SIP, which is a dominant signal protocol in NGN. The method includes:

Block 201: When receiving a SPIT reporting instruction from a user, the terminal sends the SPIT reporting instruction to a SPIT reporting module. The SPIT reporting module sends the call register of call requests, which the SPIT reporting module detecting, and displays to the user.

In an embodiment, the terminal may not be allowed to report the SPIT users unless that user has called the terminal in past. The terminal is permitted to activate the SPIT reporting function if the terminal received a call request in idle status, and answered the call request, for example, monitoring the 200 OK signaling or ACK signaling.

Block 202: The user selects a call register on the terminal to report the received call as SPIT. If the user determines not to report the user, the process ends.

In an embodiment, each call register may include: call time, SIP address and IP address of both the calling user and the called user. The call registers are sorted according to call time. The terminal may auto-save a predetermined number of call registers in a call registers list. When it exceeds the predetermined number, the terminal will automatically delete the call registers having the earliest call time.

Block 203: The terminal obtains the call register to report, including call time, the calling user's identifier and the called user's identifier, for example, SIP address and IP address of calling user and called user.

Block 204: The SPIT reporting module sets the call register to be reported into a SPIT reporting request and sends the SPIT reporting request to the server.

Block 205: The reporting process is complete, upon the SPIT reporting module receiving a reporting response from the server.

Block 206: If the terminal doesn't receive the reporting response from the server in a predetermined time, the terminal determines whether to resend the reporting request or not. If yes, return to 204, and resend the reporting request to the server. Otherwise, complete the process.

Figure 3:
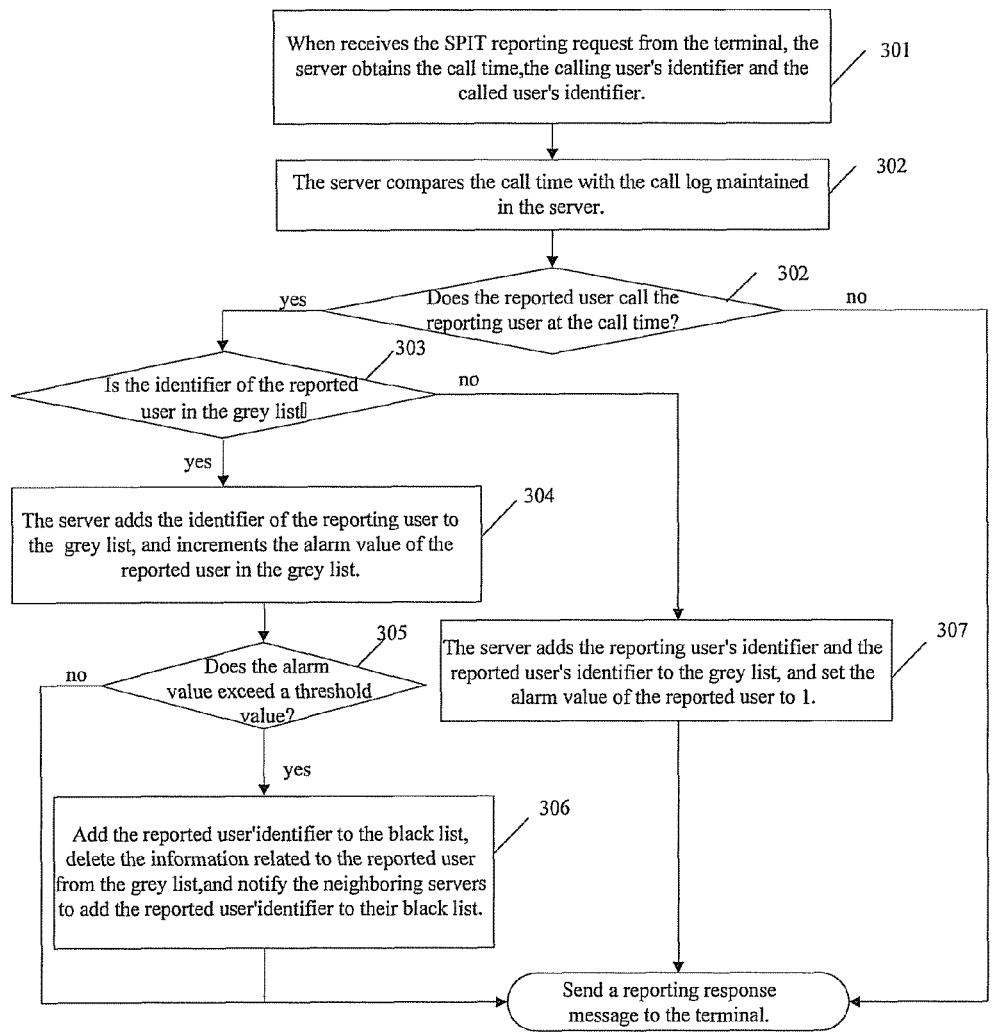
FIG. 3 is a flowchart showing the process of a server processing the SPIT reporting request, according to an embodiment of the present invention.

FIG. 3 is a flowchart showing the process of a server processing the SPIT reporting request according to an embodiment of the present invention. The process includes:

Block 301: The server obtains reporting information from the SPIT reporting request, when it receives the SPIT reporting request.

In an embodiment, the reporting information includes: call time, the reporting user's identifier and the reported user's identifier.

Block 302: The server compares the call time, the reporting user's identifier and the reported user's identifier with the call log maintained in the server. If the reported user hasn't called reporting user at the call time, the server will not process the reporting request, and will send a response to the terminal.

Block 303: If the reported user called reporting user at the call time, the server searches a temporary reporting record in the server to determine whether the calling user's identifier in the temporary reporting record. The temporary reporting record is also referred as a grey list; the reporting record is also referred as a black list.

Block 304: If the calling user's identifier is in the grey list, the server adds the reporting user's identifier corresponding to the reported user to the grey list, and increments the alarm value of the reported user in the grey list.

Block 305: The server determines whether the alarm value exceeds a preestablished threshold value, if not exceed the threshold value, it sends a response message to the terminal to notify the terminal that the reporting was successful.

Block 306: If the alarm value does exceed the threshold value, the server saves the identifier of reported user on the black list, and sends a response message to the terminal to notify the terminal that the report was successful. In an embodiment, the server may send a message to other servers, notifying the other servers to save the identifier of reported user to their black lists.

Block 307: If the calling user's identifier is not in the grey list, the server saves the reported user's identifier and the reporting user' identifier to the grey list, sets the alarm value of the reported user as 1, and sends a response message to the terminal to notify that the terminal reporting was successfully.

Here, the reported user and reporting user respectively correspond to the calling user and called user.

Figure 4:
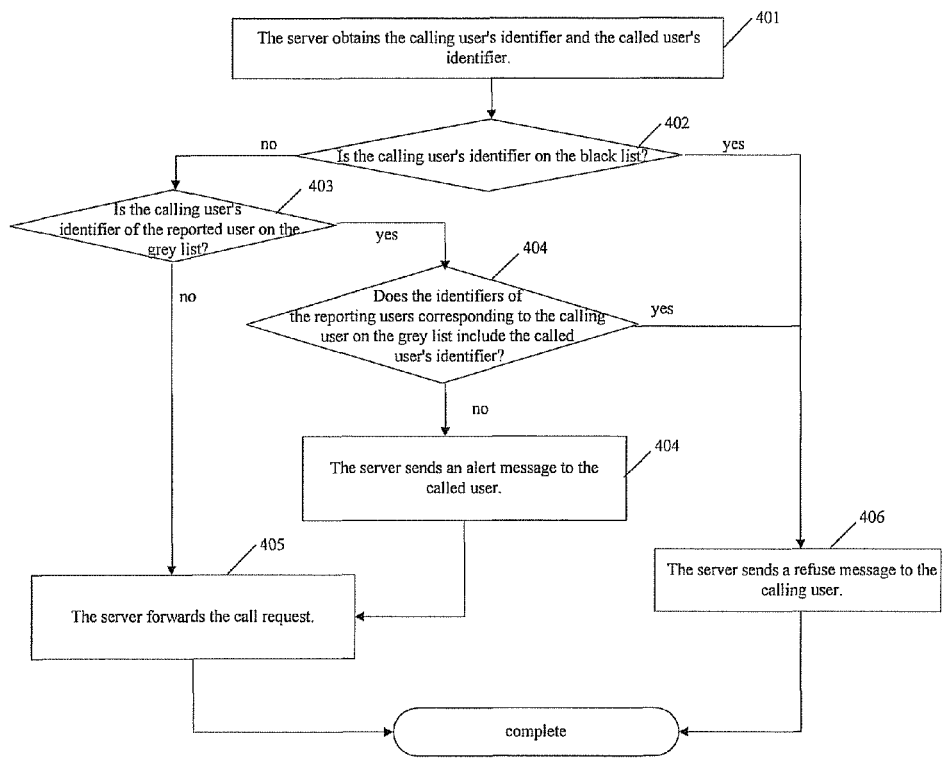
FIG. 4 is a flowchart showing the process of a server processing the call request, according to an embodiment of the present invention.

FIG. 4 is a flowchart showing the process of a server processing the call request, according to an embodiment of the present invention. The process includes:

Block 401: The server obtains the calling user's identifier and called user's identifier from a received new call request.

Block 402: The server compares the calling user's identifier with each of the identifiers of the reported users in the black list.

Block 403: If the black list does not include the calling user's identifier, the server compares the calling user's identifier with each of the identifiers of the reported users in the grey list.

Block 404: If the grey list includes the calling user's identifier, the server determines whether the identifiers of the reporting users corresponding to the calling user on the grey list include the called user's identifier. If the identifiers of the reporting users corresponding to the calling user on the grey list don't include the called user's identifier, the server sends an alert message to the called user.

Block 405: If the grey list does not include the calling user's identifier, or if the identifiers of the reporting users corresponding to the calling user on the grey list don't include the called user's identifier, the server forwards the received new call request, and completes the process.

Block 406: If the black list includes the calling user's identifier, or if the identifiers of the reporting users corresponding to the calling user on the grey list include the called user's identifier, the server sends a 'refuse' message to the calling user of the new call request, and completes the process.

Figure 5:
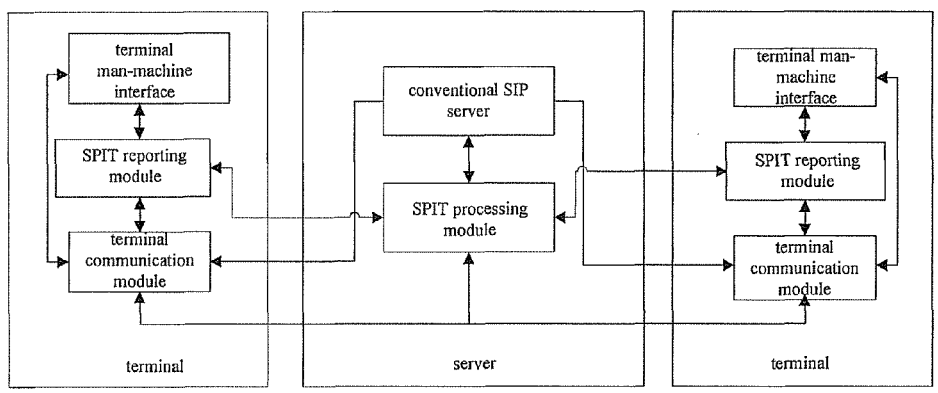
FIG. 5 is a schematic drawing showing a system for preventing SPIT according to an embodiment of the present invention.

FIG. 5 illustrates a system for preventing SPIT according to an embodiment of the present invention. The system includes: at least two terminals with the function of reporting SPIT, and a server with the function of preventing SPIT.

The terminal includes: a terminal man-machine interface, a SPIT reporting module, and a terminal communication module. The server includes: a SPIT processing module.

In an embodiment, the terminal communication module sends a call request to the man-machine interface, upon receiving the call request from the server.

The SPIT reporting module is capable of detecting the call requests received by the terminal communication module; providing call requests records to the user via the man-machine interface after receiving a SPIT reporting instruction by a user via the man-machine interface; and setting the identifier of the calling user which the user select into a SPIT reporting request, and sending the SPIT reporting request to the SPIT processing module of the server.

The SPIT processing module is on the base of the protocol stack of SIP server, the SPIT processing module processes the received SIP signaling before other components of the server.

The SPIT processing module is capable of obtaining and saving the calling user's identifier as SPIT user. The SPIT processing module obtains a new calling user's identifier and determining whether the new calling user's identifier is in the list of SPIT users, refuses to forward the new call request if the new calling user's identifier is in the list of SPIT users.

Figure 6:
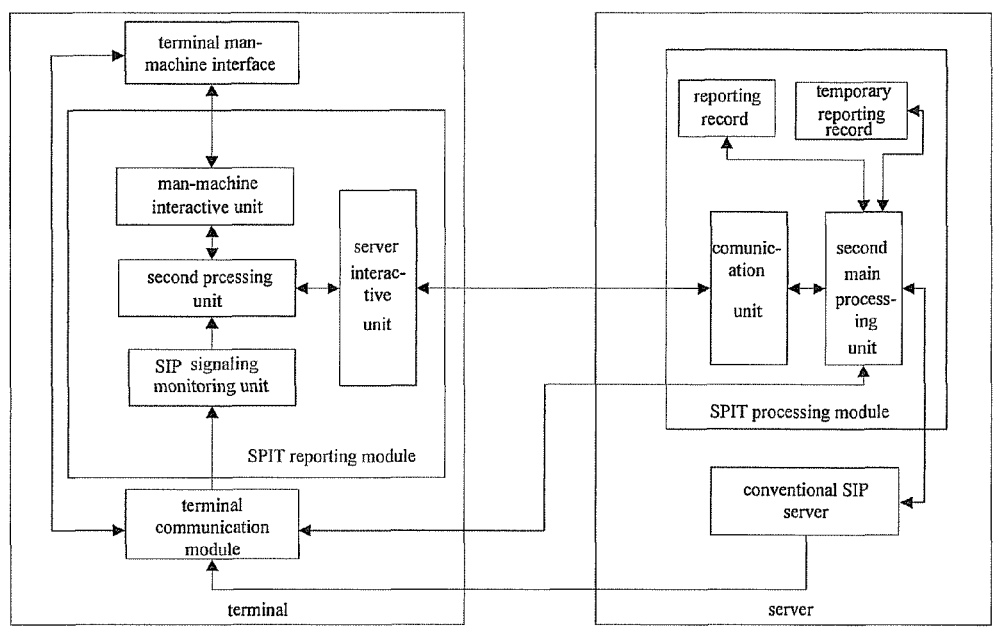
FIG. 6 is a schematic drawing showing a SPIT reporting module and a SPIT processing module according to an embodiment of the present invention.

FIG. 6 is a schematic drawing showing a SPIT reporting module and a SPIT processing module according to an embodiment of the present invention. As shown in FIG. 6, the SPIT reporting module includes: a man-machine interactive unit, an SIP signaling monitoring unit, a first main processing unit and a server interactive unit.

The man-machine interactive unit is coupled to the terminal man-machine interface, configured to transmit the user's reporting request received from the terminal to the first processing unit, and to receive the response message from the first processing unit to confirm the reporting SPIT user. The man-machine interactive unit is further configured to provide related alert messages for the user via the terminal man-machine interface when the reporting process finishes or is determined to be unsuccessful.

The SIP signaling monitoring unit is configured to monitor and record the call requests received by the terminal communication module, and to send the calling user's identifier and the called user's identifier to the first main processing unit.

When the terminal receives a call request, the SIP signaling monitoring unit obtains the calling user's identifier and the called user's identifier from the terminal communication module, and transmits the calling user's identifier and the called user's identifier to the first processing unit. When the first main processing unit finishes the process of reporting to the server, the SIP signaling monitoring unlit clears the current call register, and goes into idle status, monitoring the SIP signaling message.

The first main processing unit is configured to receive and save the calling user's identifier and the called user's identifier which are sent from the SIP signaling monitoring unit.

The SIP signaling monitoring unit is further configured to send the call time of the monitored call request to the first main processing unit. The first main processing unit receives and saves the call register of the call request from the SIP signaling monitoring unit. The call registers includes a call time, the calling user's identifier and the called user's identifier, e.g. the SIP address and the IP address.

In an embodiment, the first main processing unit sorts the call registers of the call requests according to the call time. The terminal can set the maximum number of the call registers saved by the first main processing unit. When the number of the call registers exceeds the maximum, the first main processing unit will automatically delete the call register of the earliest call time.

In an embodiment, the first main processing unit is further configured to receive a reporting instruction via the man-machine interactive unit, and to notify the man-machine interactive unit send the call registers to be displayed by the terminal man-machine interface. In an embodiment, the default mode of a terminal displays the most recent call register first, and the user may select the previous call register by scrolling the call registers. If the user wants to report a call request, the first main processing unit obtains the calling user' identifier and the called user's identifier, sets the calling user's identifier and the called user's identifier into the SPIT reporting request, and sends the SPIT reporting request to the server interface unit.

In an embodiment, the first main processing unit may set the call time of the call register into the SPIT reporting request, and sends the SPIT reporting request to the server interface unit. The SPIT reporting request may contain: the SIP address of the reported user, the IP address of the reported user, the SIP address of the reporting user, the IP address of the reporting user, and the call time.

The server interface unit establishes the message interface between the terminal and the server. The communication protocol between the server and the terminal may be SIP or an other communication protocol. The server interactive unit is configured to transfer the received SPIT reporting request to the communication unit of the SPIT processing unit in the server, to receive a reporting response message from the communication unit, and to send the reporting response message to the first main processing unit. The first main processing unit sends the reporting response message to the terminal man-machine interface via the man-machine interactive unit, to display to the user.

As shown in FIG. 6, the SPIT processing module includes: a communication unit, a second main processing unit, a reporting record unit and a temporary reporting record unit. The communication unit is configured to communicate with the server interactive unit of the SPIT reporting module in the terminal and with communication units of the neighboring servers.

Specifically, the communication unit is configured to obtain reporting information from the received SPIT reporting request and transfer the reporting information to the second main processing unit. The communication unit is further configured to receive the response message from the second main processing unit, and transfer to the server interactive unit in the terminal. The reporting information includes: call time, the reporting user's identifier and the reported user's identifier.

The communication protocol used in the communication unit is similar to that of the server interactive unit, e.g. SIP or other communication protocol.

Further, the communication unit is sends the reporting records in the reporting record unit to the neighboring servers. The communication protocol which the SPIT processing unit in the neighboring servers supports may be the same protocols the communication unit and server interactive unit.

In an embodiment, the function of the second processing unit includes: determining whether to forward the call request to the conventional SIP server; and receive and process the SPIT reporting request from the terminal via the communication unit.

In an embodiment, the second processing unit is capable of obtaining the calling user's identifier and the called user's identifier, searching the reporting record unit and the temporary reporting record unit to determine whether the identifiers are listed, and processing the call request according to the search result.

Processing the call request according to the searching result includes four conditions as follows.

If the calling user's identifier is not listed in the reported users' identifiers saved in the reporting record unit or temporary reporting record unit, the second main processing unit transfers the call request to the conventional SIP server. The conventional SIP server forwards the call request to the called user.

If the calling user's identifier is listed in the reported users' identifiers saved in the reporting record unit, the second main processing unit will not forward the call request, and will send a 'refuse' message to the calling user via the communication unit.

If the identifier of the calling user is listed in the reported users' identifiers saved in the temporary reporting record unit, the second main processing unit further searches the temporary reporting record unit to determine whether the called user's identifier is listed. If the called user's identifier is listed, the second main processing unit will not forward the call request, and sends a 'refuse' message to the calling user via the communication unit. If the called user's identifier is not listed, the second main processing unit will send a notifying message to the called user to notify the calling user that it has been reported by other users, and forward the call request to the conventional SIP server.

The second main processing unit obtains the reporting information from the received SPIT reporting request from the communication and compares the reporting information with reporting information in the temporary reporting record, and processes the reporting request according to the comparison.

If the reporting information received by the second main processing unit includes the reporting user's identifier and the reported user's identifier, the processing of the second main processing unit processes the reporting request according to the comparison may include any of three conditions as follows.

1) If the second main processing unit confirms that the reported user's identifier exists in the temporary reporting record, increment the alarm value by one and save the reporting user's identifier to the temporary reporting record. The second main processing unit determines whether the alarm value exceeds a predetermined value or not, and retain the reported user's identifier in the temporary reporting record if it does not exceed the predetermined value.

2) If the alarm value exceeds the predetermined value, the second main processing unit adds the reported user's identifier to the reporting record, deletes the reported user's identifier from the reporting record, and sends a message to other servers via the communication unit to notify the other servers to add the reported user to their reporting record.

3) If the second main processing unit confirms that the reported user's identifier does not exist in the temporary reporting record, the second main processing unit adds the reported user's identifier and the reporting user's identifier to the temporary reporting record, and sets the alarm value of the reported user in the temporary reporting record to 1.

If the reporting information received by the second main processing unit includes call time, the second main processing unit determines whether the reported user called the reporting user at the call time. If the reported user called the reporting user at the call time, the second main processing unit processes the reporting request according to the three conditions above. If the reported user did not call the reporting user at the call time, the second main processing unit deletes the reporting request.

In an embodiment, the SPIT reporting module is implemented by existing hardware of a conventional terminal. In an alternative embodiment, hardware is added to a conventional terminal to implement this function.

In an embodiment, the SPIT processing module is implemented by existing hardware of a conventional server. In an alternative embodiment, hardware is added to a conventional terminal to implement this function.

Although the present invention has been described through several embodiments, a myriad of changes, variations, alterations, transformations, and modifications may be suggested to one skilled in the field, and it is intended that the present invention comprise such changes, variations, alterations, transformations, and modifications as fall within the scope of the appended claims.

What is claimed is:

1. A method for preventing SPAM over Internet Telephony (SPIT), comprising:
   detecting, by a terminal, received call requests, and setting an identifier of a calling user of the call request, a call time and a called user's identifier of the call request into a SPIT reporting request if it is determined that the calling user is a SPIT caller, and sending the SPIT reporting request to a server;
   obtaining and saving, by the server, the calling user's identifier from the received SPIT reporting request;
   obtaining, by the server, the call time, the calling user's identifier, and the called user's identifier from the SPIT reporting request in response to receiving the SPIT reporting request;
   comparing, by the server, the call time, the calling user's identifier and the called user's identifier with records of a call log maintained in the server; if the calling user did not call the called user at the call time according to the records, then sending, by the server, a response message stating such to the terminal; if the calling user called the called user at the call time according to the records, then setting, by the server, the calling user's identifier as being of a SPIT user;
   upon receiving a new call request, obtaining, by the server, the calling user's identifier of the new call request, determining whether the calling user's identifier is saved and set as a SPIT user, and refusing to forward the new call request if the calling user's identifier is set as a SPIT user;
   if the calling user's identifier is not set as a SPIT user, determining, by the server, whether the calling user's identifier is in the list of reported users, and forwarding the new call request if not in the list of reported users; if the calling user's identifier is in the list of reported users, determining, by the server, whether the called user's identifier is in the list of the reporting users corresponding to the reported user, and refusing, by the server, the new call request if the called user's identifier is in the list of the reporting users corresponding to the reported user, forwarding, by the server, the new call request if the called user's identifier is not in the list of the reporting users corresponding to the reported user.

2. The method of claim 1, further comprising:
   communicating, by the server, the calling user identifiers on the reporting record to other servers.

* * * * *